Figures 1, 2, 3:
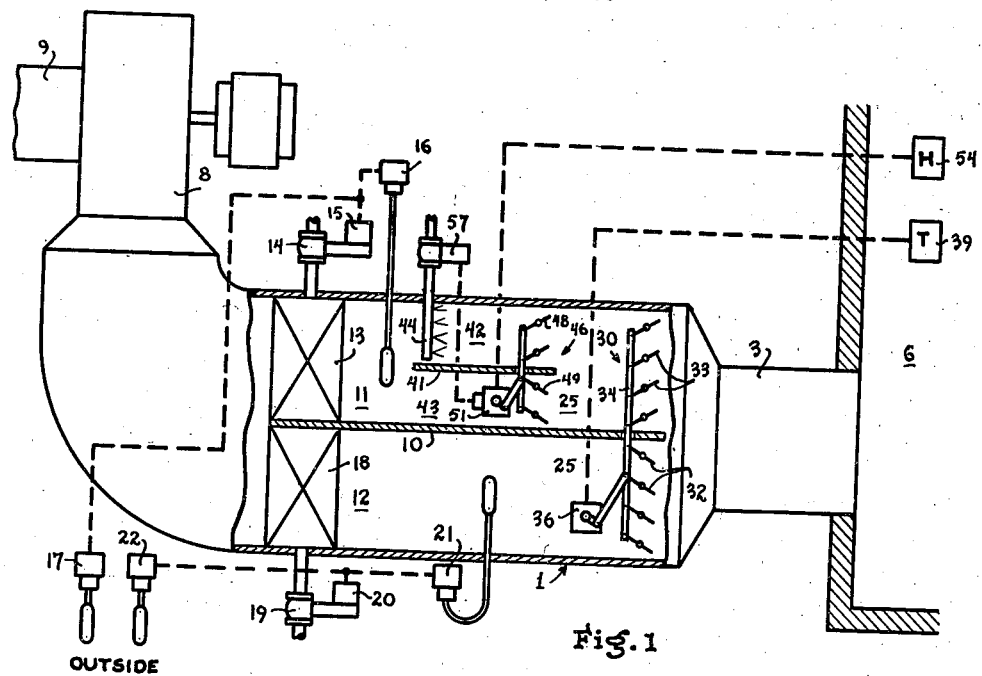

Aug. 26, 1941.  A. B. NEWTON  2,254,185
AIR CONDITIONING SYSTEM
Filed Dec. 28, 1939

Inventor
Alwin B. Newton
By George H. Fisher
Attorney

Patented Aug. 26, 1941

2,254,185

UNITED STATES PATENT OFFICE 2,254,185

AIR CONDITIONING SYSTEM

Alwin B. Newton, Minneapolis, Minn., assignor to Minneapolis-Honeywell Regulator Company, Minneapolis, Minn., a corporation of Delaware Application December 28, 1939, Serial No. 311,388

4 Claims. (Cl. 257—3)

This invention relates in general to air conditioning and more particularly to automatically controlled combined heating and cooling systems.

It is an object of this invention to provide a summer-winter air conditioning system in which a stream of relatively cool air and a stream of relatively warm air are supplied simultaneously to a conditioned space, the proportions of the streams being controlled automatically to maintain the desired temperature, and in which the humidity of one of the streams is varied under the control of a humidity responsive device for maintaining the desired humidity in the space.

A further object of this invention is the provision of a system having warm and cold plenum chambers connected by individual ducts to a plurality of zones, with a simple and effective arrangement for individually controlling the humidity of the air being supplied to the various zones for thereby maintaining desired humidity conditions in each zone.

Another object of this invention is the provision of a system for individually controlling the temperature and humidity in a plurality of zones, this system consisting of a plenum chamber for heated humidified air and a plenum chamber for heated unhumidified air, the total volume of air from both plenums supplied to zones being individually controlled in accordance with the temperatures in the various zones and the proportions of humidified and unhumidified air being individually controlled in accordance with the humidity in the zones.

Other objects will appear from the following description and the appended claims.

For a full disclosure of this invention, reference is made to the following detailed description and to the accompanying drawing in which:

Figure 1 is a sectional view of the conditioner and which diagrammatically indicates the controls, Figure 2 is a top view of the conditioner and ducts of Figure 1, Figure 3 is a diagrammatic view of a portion of a modification of Figures 1 and 2.

Referring to the drawing, reference character 1 indicates an air conditioner which is connected by individual supply ducts 2, 3, and 4 to the conditioned zones 5, 6, and 7. The conditioner 1 is of the "push through" type having a fan 8 connected to the inlet thereof. This fan is provided with an inlet duct 9 which leads from return duct work, not shown, for delivering return air from the zones 5, 6, and 7 to the conditioner. This inlet duct 9 may also be provided with a fresh air inlet for thereby supplying fresh air for ventilation purposes.

The conditioner 1 is divided by a horizontal partition 10 into a heating chamber 11 and a cooling chamber 12, these chambers extending the full width of the conditioner. Chamber 11 is provided with a heating coil 13 which extends the full width of the conditioner as shown in Figure 2 and which is provided with an inlet valve 14 which controls the flow of heating medium into this coil. The valve 14 is positioned by a proportioning motor 15 which is controlled by means of a thermostat 16 responding to the temperature of the air heated by the coil. This thermostat serves to open the valve upon a fall in air temperature and to close the valve upon a rise in this temperature. The thermostat 16 is adjusted by means of an outside thermostat 17 which serves to adjust the control point of the thermostat 16 in accordance with outside temperature. This thermostat 17 acts upon a fall in outside temperature to raise the setting of thermostat 16 so as to supply warmer air from the coil 13. Preferably, the thermostat 17 is arranged so that when outside temperature rises to 60° it sets the thermostat 16 to maintain a temperature of 70° leaving the heating coil. By this arrangement during the cooling cycle, the steam valve 15 will usually be closed entirely. The details by which thermostats 16 and 17 control the valve 15 do not form a part of this invention. For a disclosure of the details, reference is made to the Haines Patent No. 2,173,331.

In the cooling chamber 12 is located a cooling coil 18 which extends the full width of the conditioner similarly to the coil 13. This cooling coil is provided with an inlet valve 19 which is positioned by a proportioning motor 20 under the control of a thermostat 21 responding to the temperature of the cool air discharged from coil 18. The motor 20 is also controlled by an outside thermostat 22 which serves to adjust the control point of the thermostat 21 in accordance with outside temperature. This thermostat 22 upon a rise in outside temperature acts to lower the control point of thermostat 21 so that colder air is discharged from the coil 18. This thermostat 22 may be arranged so that when outside temperature is at 50° it adjusts the thermostat 21 so as to maintain the temperature of the cooled air at 70°. By this arrangement, when outside temperature falls below 50°, the valve 19 for the cooling coil will be maintained closed.

The conditioner 1 is divided near its outlet end by means of vertical partitions 24 and 25 (Figure 2) into damper passages 26, 27 and 28. The damper passage 26 communicates with the duct 2, the damper passage 27 communicates with the duct 3 and the passage 28 communicates with the duct 4. These damper passages are each provided with dampers 29, 30 and 31, the damper 30 being shown in Figure 1. These dampers are all alike, each consisting of a first set of blades 32 controlling the passage of cool air from chamber 12 and a second set of blades 33 controlling the flow of warm air from chamber 11 of the conditioner. These two sets of blades are connected together by means of an actuating member 34 which causes these dampers to move in opposite manners. Thus as the flow of air from chamber 11 is increased, the flow of air from chamber 12 is decreased and vice versa. The dampers 29, 30 and 31 are individually actuated by means of proportioning motors 35, 36 and 37. The motor 35 is controlled by a thermostat 38 located in zone 5, the motor 36 is controlled by a thermostat 39 in zone 6, and motor 37 is controlled by a thermostat 40 in zone 7. By the arrangement just described, it will be apparent that the thermostats 38, 39 and 40 control the proportions of warm and cool air from the chambers 11 and 12 of the conditioner, these proportions being varied in a manner to maintain the temperature at each zone constant. For example, if the temperature in zone 6 rises, the thermostat 39 will cause the motor 36 to position the damper 30 for decreasing the proportion of warm air supplied by chamber 11 and increasing the proportion of cool air supplied by chamber 12. Upon a decrease in temperature in the zone 6, the opposite action will occur for thereby increasing the temperature of the air supplied to the zone.

In order to provide control of the humidity, the heating chamber 11 is subdivided by a horizontal partition 41 which extends the entire width of the conditioner 1. This partition 41 divides the chamber 11 into a humidifying chamber 42 and a by-pass chamber 43. In the humidifying chamber 42 is located a humidifier which is illustrated as comprising a plurality of spray pipes 44, this humidifier extending the full width of the conditioner 1 as shown in Figure 2. While partition 41 is shown for purposes of illustration as a flat wall, it is to be understood that in an actual installation, it would take the form of a trough with a drain leading therefrom.

It will be noted that the vertical partitions 24 and 25 terminate short of the humidifier 44 so that air passing through any portion of this humidifier can pass into any one of the chambers 26, 27 and 28. In order to control the humidity of the air supplied to each zone, passages 26, 27 and 28 are provided with humidity control dampers 45, 46 and 47, damper 46 being shown in Figure 1. Each of these dampers consists of a first set of blades 48 for controlling the flow of air from the humidifying chamber 42 and a second set of blades 49 for controlling the flow of air from the by-pass chamber 43. These two sets of blades are connected so as to be operated in unison but oppositely by a proportioning motor. Thus the damper 45 is positioned by a proportioning motor 50, damper 46 is positioned by a motor 51, and damper 47 is positioned by a motor 52. The motor 50 is controlled by a humidity controller 53 located in zone 5, motor 51 is controlled by a humidity controller 54 in zone 6, and motor 52 is controlled by a humidity controller 55 in zone 7. By this arrangement, each humidity controller serves to position its corresponding damper for varying the proportions of humidified and by-passed air supplied to its zone and in this manner controls the humidity of the air therein. For example, if the humidity in zone 6 rises, the controller 54 will cause the motor 51 to position the damper 47 in a manner to increase the flow of air through the by-pass 43 and decrease the amount of air taken from the humidifier chamber 42. When the humidity in zone 6 is above the control point of controller 54, the controller 51 will position the damper 47 for causing it to admit only air from the by-pass chamber 43 into the passage 27. Thus at this time no humidified air is supplied to the zone 6. The humidity controllers 53 and 55 of course operate in the same manner upon their respective dampers.

When the humidity controller of each zone is satisfied, it is desirable to place the humidifier 44 out of operation. In order to obtain this action, the humidity control proportioning motors 50, 51 and 52 are each provided with auxiliary switches 56. These switches are each adjusted so as to open whenever the corresponding damper is positioned for preventing flow of air from the humidifier chamber while closing when its damper is positioned for permitting air to flow from said humidified chamber. These switches 56 are connected in parallel to the water valve 57 which controls the flow of water to the humidifier. By this arrangement, when all of the humidity controllers are satisfied, the water valve 57 is closed, but whenever any one humidity controller calls for humidifying, the valve 57 will be opened.

With the arrangement shown in Figures 1 and 2, the damper blades 33 are completely closed upon the thermostat of that zone calling for the maximum amount of cooling. This prevents any humidified air from being supplied to the zone. In most cases, this is not a disadvantage since humidification will not be needed during the cooling season. In certain localities, however, humidification may be required even when maximum cooling is necessary. In such case, the humidifier damper motors may be provided with switches for inserting suitable resistance into the thermostat circuit for insuring that at least a minimum amount of warm air is supplied to a zone upon call for dehumidification.

Such an arrangement is shown in Figure 3. A further auxiliary switch 65 is associated with the motor 51. This auxiliary switch 65 is adjusted to open whenever the blades 48 are open to admit air to flow through the humidifier chamber and to close whenever the blades 48 are closed. A variable resistance 66 is inserted in the connection between thermostat 39 and damper motor 36. As long as this resistance is in the thermostat circuit, the damper blades 33 cannot be completely closed. The auxiliary switch 65 is connected to the resistance 66 by conductors 67 so as to shunt the resistance 66 when the switch is closed. Thus as long as humidostat 54 is calling for humidification, the damper blades 33 cannot be closed. For a more detailed description of the operation of such a minimum position resistance and associated switch, reference is made to the patent to George D. Kingsland, No. 2,123,428, of July 12, 1938.

A similar auxiliary switch and resistance is associated with the control equipment of each of the other zones. Thus, with the arrangement of Figure 3, it is possible to obtain humidification of the air regardless of the demand for cooling.

From the foregoing description, it will be apparent that each zone thermostat serves to position its corresponding damper for controlling the proportions of cool and warm air supplied to its zone in a manner for maintaining the zone at constant temperature. During the summer, the outside thermostat 17 will adjust the discharge thermostat 16 for a temperature which is lower than the return air temperature and consequently this thermostat will be satisfied without causing the heating valve 14 to open. At this time, the outside thermostat 22 will adjust the control point of the discharge thermostat 21 for lowering the temperature of the air leaving the cooling coil 12 upon increase in outside temperature.

During intermediate seasons the thermostats 17 and 22 will adjust the thermostats 16 and 21 so that both the heating coil 13 and cooling coil 12 operate to some extent thereby permitting some zones to receive air for cooling and other zones to simultaneously receive air for heating. During the winter the thermostat 22 will adjust thermostat 21 so that the cooling coil 12 is out of operation and the thermostat 17 will adjust the discharge thermostat 16 so as to supply hotter air as outside temperature decreases. At all times the humidifier 44 can be operated whenever the humidity in any one zone becomes too low. Whenever the humidifier is operating, the humidity controllers by varying the proportions of humidified and unhumidified air withdrawn from the conditioner, will maintain the proper humidity in each zone.

While I have shown and described but a single form of invention, it will be apparent that many changes may be made without departing from the scope thereof. It is therefore desired to be limited only by the scope of the appended claims.

I claim as my invention:

1. In an air conditioning system for a plurality of zones, in combination, first air supply means for providing a supply of relatively warm air, second air supply means for providing a supply of relatively cool air, individual duct means leading from said first and second air supply means to said zones for supplying simultaneously both cool and warm air to said zones, individual flow control means interposed between said first and second air supply means and said individual duct means for controlling the proportions of cool and warm air passed into said individual duct means, said cool and warm air being mixed in said individual duct means to form individual streams of air for said zones which vary in temperature in accordance with said individual flow control means, individual zone thermostatic means for controlling corresponding flow control means, means for dividing the warm air of said first air supply means into first and second streams prior to mixing in said individual duct means, means for humidifying said first stream, individual damper means for controlling the proportions of said first and second streams entering each individual duct means, and individual moisture responsive devices influenced by the moisture content of the air in said zones for controlling corresponding individual damper means.

2. In an air conditioning system for a plurality of zones, in combination a first plenum chamber, heating means for heating the air in said first plenum chamber, a second plenum chamber, cooling means for cooling the air in said second plenum chamber, first and second thermostatic means for controlling the temperature of the air in said first and second plenum chambers, individual duct means leading from said first and second plenum chambers to said zones for supplying simultaneously both cool and warm air to said zones, individual flow control means interposed between said first and second plenum chambers and said individual duct means for controlling the proportions of cool and warm air passed into said individual duct means, said cool and warm air being mixed in said individual duct means to form individual streams of air for said zones which vary in temperature in accordance with said individual flow control means, individual zone thermostatic means for controlling corresponding flow control means, means for dividing the air of said first plenum chamber into first and second portions common to all of said individual duct means, a humidifier for humidifying the air of one of said portions, individual damper means in the individual duct means for controlling the proportions of said first and second portions passed into said individual duct means, and individual moisture responsive devices influenced by the moisture content of the air in said zones for controlling said damper means and said humidifying means.

3. In an air conditioning system, in combination, means for providing a stream of relatively warm air for supply to a conditioned space, means for providing a stream of relatively cool air for supply to said space, thermostatically controlled means influenced by the demand for heating o. cooling in said space for varying in a modulating manner the proportions of said warm air stream and the cool air stream supplied to said space for maintaining a predetermined temperature in said space, means for dividing one of said air streams into first and second portions, means for changing the moisture content of the air in one of said portions, means influenced by the humidity of the air in said space for controlling said last mentioned means, and means controlled by said humidity influenced means for preventing said thermostatically controlled means from completely interrupting the flow of warm air to said space when there is a demand for humidification.

4. In an air conditioning system, in combination, means including heating means for providing a first stream of relatively warm air for supply to a conditioned space, means including cooling means for providing a second stream of relatively cool air for supply to said space, thermostatically controlled means influenced by the temperature of said space for controlling in a modulating manner the proportions of the first and second streams of air passed to said space for maintaining a predetermined temperature in said space, means for dividing said warm air stream into first and second portions, means for humidifying one of said portions, damper means for controlling the proportions of the first and second portions, means influenced by the humidity of the air in said space for controlling said damper means, and means controlled by said humidity influenced means for preventing said thermostatically controlled means from completely interrupting the flow of warm air to said space when said damper means is in a position permitting a flow of the humidified portion of said warm air stream.

ALWIN B. NEWTON.